(12) United States Patent
Dolisy

(10) Patent No.: US 7,909,383 B2
(45) Date of Patent: Mar. 22, 2011

(54) MIRROR MODULE FOR VEHICLE COMPONENT AND METHOD OF ASSEMBLING A MIRROR MODULE

(75) Inventor: Jacky Dolisy, Bisten en Lorraine (FR)

(73) Assignee: Johnson Controls Interiors GmbH & Co. KG, Grefrath (DE)

( * ) Notice: Subject to any disclaimer, the term of this patent is extended or adjusted under 35 U.S.C. 154(b) by 361 days.

(21) Appl. No.: 11/792,615

(22) PCT Filed: Dec. 14, 2005

(86) PCT No.: PCT/EP2005/056794
§ 371 (c)(1),
(2), (4) Date: Jun. 8, 2007

(87) PCT Pub. No.: WO2006/064027
PCT Pub. Date: Jun. 22, 2006

(65) Prior Publication Data
US 2008/0130150 A1 Jun. 5, 2008

(30) Foreign Application Priority Data
Dec. 15, 2004 (DE) .......................... 10 2004 060 758

(51) Int. Cl.
*B60J 3/00* (2006.01)
(52) U.S. Cl. ...................................... 296/97.1
(58) Field of Classification Search ................ 296/97.1, 296/97.5, 97.8; 362/135, 494, 492
See application file for complete search history.

(56) References Cited

U.S. PATENT DOCUMENTS

| | | | | |
|---|---|---|---|---|
| 4,564,234 A * | 1/1986 | Kaiser et al. | ................. | 296/97.5 |
| 4,648,011 A * | 3/1987 | Boote et al. | ................... | 362/135 |
| 4,653,798 A * | 3/1987 | White et al. | ................. | 296/97.5 |
| 4,791,537 A * | 12/1988 | Fisher et al. | ................. | 362/135 |
| 4,809,140 A * | 2/1989 | Jonsas | ........................... | 362/492 |
| 4,858,983 A * | 8/1989 | White et al. | ................ | 296/97.13 |
| 4,922,391 A * | 5/1990 | Dykstra | ....................... | 362/492 |
| 4,948,240 A * | 8/1990 | Zipperle | ....................... | 359/844 |
| 5,004,138 A * | 4/1991 | Gabas | ........................ | 224/312 |
| 5,005,895 A * | 4/1991 | Muyres et al. | ............... | 296/97.8 |
| 5,054,839 A * | 10/1991 | White et al. | .................. | 296/97.1 |
| 5,067,764 A * | 11/1991 | Lanser et al. | ................ | 296/97.5 |
| 5,188,446 A * | 2/1993 | Miller | ........................... | 362/492 |
| 5,205,639 A * | 4/1993 | White et al. | .................. | 362/137 |
| 5,283,696 A * | 2/1994 | Lanser et al. | ................. | 359/870 |
| 5,365,416 A * | 11/1994 | Peterson | ....................... | 362/135 |
| 5,438,491 A * | 8/1995 | White | ........................... | 362/492 |
| 5,441,325 A * | 8/1995 | Toth et al. | .................... | 296/97.2 |
| 5,475,573 A * | 12/1995 | White | ........................... | 362/492 |

(Continued)

FOREIGN PATENT DOCUMENTS

DE 198 60 180 A1 7/2000

(Continued)

*Primary Examiner* — Kiran B. Patel
(74) *Attorney, Agent, or Firm* — Foley & Lardner LLP

(57) ABSTRACT

A mirror module for a vehicle component, for example a sun visor, includes a module frame, a mirror connected to the module frame and a having a mirrored surface and a mirror cover supported at the mirrored surface of the mirror. The mirror cover includes a guide that allows the mirror cover to be selectively displaced along a track that is separate from the mirror module between a first position in which the mirrored surface is substantially covered by the mirror cover and a second position in which the mirrored surface is at least partially not covered by the mirror.

18 Claims, 3 Drawing Sheets

U.S. PATENT DOCUMENTS

| | | | | |
|---|---|---|---|---|
| 5,577,791 | A * | 11/1996 | Viertel et al. | 296/97.5 |
| 5,813,717 | A * | 9/1998 | Wilson | 296/97.5 |
| 5,895,087 | A * | 4/1999 | Viertel et al. | 296/97.5 |
| 5,964,494 | A * | 10/1999 | Miller | 296/97.1 |
| 6,076,947 | A * | 6/2000 | Miller | 362/492 |
| 6,220,644 | B1 * | 4/2001 | Tiesler et al. | 296/97.11 |
| 6,231,105 | B1 * | 5/2001 | Viertel | 296/97.2 |
| 6,435,593 | B2 * | 8/2002 | Welter | 296/97.5 |
| 6,474,717 | B2 * | 11/2002 | Viertel et al. | 296/97.11 |
| 6,692,060 | B1 * | 2/2004 | Wilson | 296/97.5 |
| 7,108,308 | B2 * | 9/2006 | Remy | 296/97.5 |
| 7,258,470 | B2 * | 8/2007 | Ogawa | 362/492 |
| 7,325,854 | B2 * | 2/2008 | Lanser et al. | 296/97.9 |
| 7,384,088 | B2 * | 6/2008 | Remy | 296/97.11 |
| 7,416,319 | B2 * | 8/2008 | Richard et al. | 362/492 |
| 2007/0267886 | A1 * | 11/2007 | Beck et al. | 296/97.1 |
| 2008/0068850 | A1 * | 3/2008 | Tiesler et al. | 362/492 |
| 2008/0130150 | A1 * | 6/2008 | Dolisy | 359/844 |
| 2009/0243330 | A1 * | 10/2009 | Bruhnke et al. | 296/97.11 |
| 2009/0244742 | A1 * | 10/2009 | Kim | 359/844 |

FOREIGN PATENT DOCUMENTS

| | | |
|---|---|---|
| DE | 202 17 313 U1 | 3/2004 |
| EP | 0 844 120 B1 | 5/1998 |
| JP | 2002-12030 | 1/2002 |
| JP | 2004-17800 | 1/2004 |

* cited by examiner

MIRROR MODULE FOR VEHICLE COMPONENT AND METHOD OF ASSEMBLING A MIRROR MODULE

CROSS-REFERENCE TO RELATED PATENT APPLICATIONS

The present application is a National Stage of International Application No. PCT/EP2005/056794 filed on Dec. 14, 2005, which claims the benefit of German Patent Application No. 10 2004 060 758.3 filed on Dec. 15, 2004. The entire disclosures of International Application No. PCT/EP2005/056794 and German Patent Application No. 10 2004 060 758.3 are incorporated herein by reference.

BACKGROUND

The present disclosure relates to a mirror module for a vehicle. More particularly, the present disclosure relates to a component having a mirror module and a method of assembling the mirror module and the component as well as the use of the component as a sun visor in a motor vehicle.

Sun visors that are mounted to be pivotally movable in vehicle bodies, and which comprise a mirror covered by a lid, are known. In such known sun visors, the lid is, for example, pivotable or displaceable so that it is optionally able to cover or reveal the mirror. German Patent No. DE 202 17 313 U1 discloses such a sun visor. The disclosed sun visor comprises two half-shells that are configured to be connected to one another. One of the half-shells comprises two guides for the lid (in which the lid may be displaced) on an inside portion of the half-shell. The lid comprises two respective elastic, U-shaped projections at the side in order to prevent distortion between the guides and to allow a substantially uniform displacement.

SUMMARY

An exemplary embodiment relates to a mirror module for a vehicle. The mirror module includes a module frame, a mirror and a mirror cover. The mirror cover is displaceably arranged between the mirror and the module frame. The mirror cover includes a guiding means for guiding the mirror cover along a sliding means that is separate from the mirror module.

Another exemplary embodiment relates to a component for a vehicle. The component includes a base body having a sliding means, a mirror supported at the base body and a mirror cover arranged on the mirror. The mirror cover is displaceable along the sliding means in and counter to a sliding direction from a first position in which the mirror is substantially covered by the mirror cover, into a second position in which the mirror is at least partially not covered by the mirror cover.

Another exemplary embodiment relates to a method for assembling a mirror module. The method includes the step of connecting a mirror to a module frame via first positive and/or non-positive connecting means. The mirror has a first side with a mirrored surface. The method also includes the step of arranging a mirror cover on the module frame at a side associated with the first side of the mirror. The first positive and/or non-positive connecting means reversibly connects the mirror to the mirror module frame.

Another exemplary embodiment relates to a component for a vehicle. The component includes a base body supporting a track. The component also includes a mirror module connected to the base body. The mirror module includes a module frame, a mirror connected to the module frame and a mirror cover. The mirror cover supports a guide corresponding to the track that allows the mirror cover to be selectively displaced along the track between a first position in which the mirror is substantially covered by the mirror cover and a second position in which the mirror is at least partially not covered by the mirror cover.

Another exemplary embodiment relates to a mirror module for a vehicle component. The mirror module includes a module frame, a mirror connected to the module frame and a having a mirrored surface and a mirror cover supported at the mirrored surface of the mirror. The mirror cover includes a guide that allows the mirror cover to be selectively displaced along a track that is separate from the mirror module between a first position in which the mirrored surface is substantially covered by the mirror cover and a second position in which the mirrored surface is at least partially not covered by the mirror.

Another exemplary embodiment relates to a method of assembling a mirror module. The method includes the step of connecting a mirror to a module frame in a reversible manner. The mirror has a first side with a mirrored surface. The method also includes the step of providing a mirror cover at the first side of the mirror. The mirror cover includes a guide that allows the mirror cover to be selectively displaced along a track that is separate from the mirror module between a first position in which the mirrored surface is substantially covered by the mirror cover and a second position in which the mirrored surface is at least partially not covered by the mirror.

DETAILED DESCRIPTION

Figure 1:
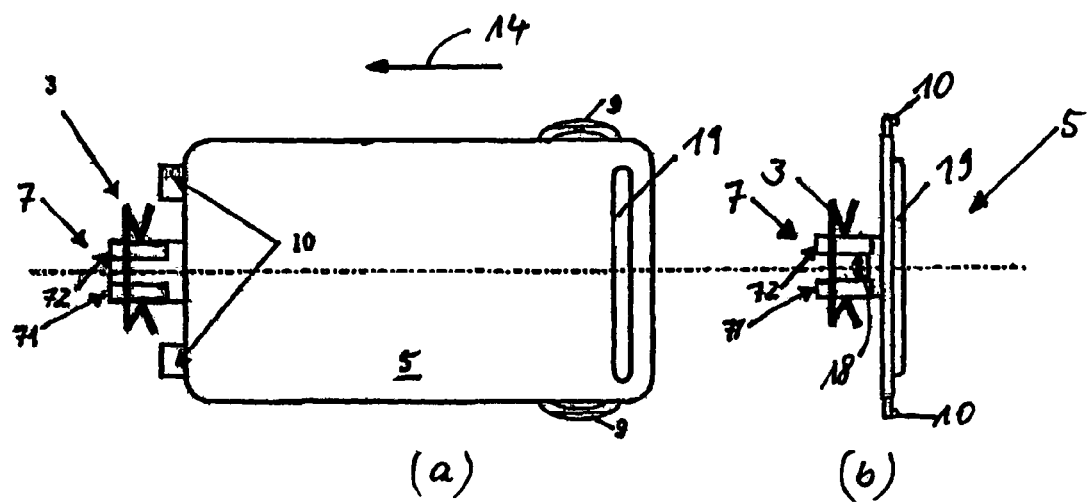
FIG. 1A is a plan view of a mirror module shown according to an exemplary embodiment.
FIG. 1B is a side view of the mirror module of FIG. 1A.

Referring generally to the FIGURES, a mirror module (e.g., for a vehicle) is shown that comprises a module frame, a mirror and a mirror cover. The mirror cover is displaceably arranged between the mirror and the module frame. The mirror cover comprises a guiding means by which means the mirror cover is guided along a sliding means. According to an exemplary embodiment, the sliding means is not arranged on the mirror module. The person skilled in the art understands that the guiding means, as well as the sliding means, are able to be provided such that a distortion of the mirror cover during displacement is substantially avoided. According to an exemplary embodiment, the guiding means allows a relatively uniform displacement along the sliding means.

According to an exemplary embodiment, the mirror cover is arranged between the module frame and the mirror. During manufacture of such an embodiment, the mirror cover is arranged on the module frame and the mirror is then fastened to the module frame. The fastening of the mirror is carried out by first positive and/or non-positive connecting means (e.g., by snap closures) so that the fastening is reversible to allow components to be exchanged. The manufacture of the mirror module may be carried out relatively rapidly and easily due to the fastening by means of first positive and/or non-positive connecting means. According to an exemplary embodiment, the module frame and the first positive and/or non-positive connecting means are manufactured in one piece (e.g., as an injection-molded part). Similarly, the mirror cover is manufactured with a guiding means in one piece (e.g., as an injection-molded part). In such an embodiment, the manufacture of the mirror module is relatively cost-effective, both relative to the cost of material and also relative to the assembly. The modular construction allows the use of the mirror module in any components of a vehicle.

The person skilled in the art understands that an arrangement of the sliding means is also possible on the mirror module (e.g., on the module frame). However, the manufacture and assembly may be easier if the sliding means is not arranged on the mirror module.

According to an exemplary embodiment, the guiding means comprises two arms arranged substantially parallel to one another. According to the embodiment illustrated, the two arms are configured such that the guiding means is substantially U-shaped or Y-shaped in cross section. Such a design for the guiding means may be manufactured relatively easily and cost-effective.

According to an exemplary embodiment, the sliding means is a single-track rail or multi-track rail extending in a sliding direction. With a single-track sliding means (e.g., in the form of a rib), the guiding means engages at least partially around the sliding means. With a multi-track sliding means (e.g., in the form of a plurality of ribs arranged substantially parallel to one another so as to form three-tracks or four-tracks), the sliding means at least partially engages around the guiding means.

The person skilled in the art understands that providing the sliding means as a two-track sliding means and the guiding means as a single-track guiding means will provide an embodiment with a low material cost. However, the cost of the material is even lower if the sliding means is manufactured as single-track sliding means and the guiding means is provided with two arms. According to an exemplary embodiment, the guiding means is provided substantially in the center of one of the edges of the mirror cover extending transversely to the sliding direction.

According to an exemplary embodiment, the arms may be clamped to one another by means of a force means (e.g., a spring). In such an embodiment, the force exerted on the arms by the force means has the effect that the spacing between the arms is elastically contracted. As a result, the arms bear at least partially on the sliding means. The person skilled in the art understands that the force exerted by the force means on the arms may be adjusted so that it compensates for the play between the guiding means and the sliding means and/or slight irregularities in the manufacture of the guiding means and/or the sliding means while ensuring an easy and very uniform displacement of the mirror cover.

According to an exemplary embodiment, the mirror cover comprises at least one first compensating means (e.g., two first compensating means). According to an exemplary embodiment, the first compensating means is elastic and U-shaped and arranged on one edge of the mirror cover parallel to the sliding direction. According to an embodiment with two first compensating means, the compensating means may be arranged parallel to one another on the respective opposing edges of the mirror cover, which extend substantially parallel to the sliding direction. The first compensating means produces compensation for the manufacturing tolerances between the module frame and the mirror cover in a plane formed by the mirror cover and arranged substantially parallel to the mirror.

According to an exemplary embodiment, the mirror cover further comprises at least one second compensating means (e.g., two second compensating means). The second compensating means extends in a direction which extends transversely to a plane formed by the mirror cover and substantially parallel to the mirror and produces compensation for the manufacturing tolerances in this direction. For example, the second compensating means may compensate for manufacturing tolerances between the module frame and a component into which the mirror module is fitted. According to an exemplary embodiment, the second compensating means is arranged on a molding which is arranged on one edge of the mirror cover extending transversely to the sliding direction. According to an exemplary embodiment, the molding and the compensating means are integral with the mirror cover. According to an embodiment in which the mirror cover comprises two second compensating means, the moldings may be arranged in the vicinity of the corners of the mirror cover and on the same edge of the mirror Cover.

According to an exemplary embodiment, the compensating means are arranged in a region of the mirror module which is not visible to the user in order not to reduce the visual effect.

According to an exemplary embodiment, the mirror module is easily constructed and may be manufactured rapidly, easily and very cost-effectively. The mirror cover may be very uniformly displaced due to the guiding means.

According to an exemplary embodiment, a component comprises a base body with a recess into which a mirror module is inserted. The component and mirror module may be manufactured independently of one another and optionally simultaneously, so that the manufacture may be carried out rapidly and cost-effectively.

According to an exemplary embodiment, the base body comprises a first base body part and a second base body part which form a cavity. In such an embodiment, the mirror module is arranged at least partially in the cavity. As a result, the mirror module may be inserted very easily into the base body through the recess.

According to an exemplary embodiment, the fastening of the mirror module is carried out by means of second positive and/or non-positive connecting means that allow the assembly to be carried out rapidly and easily. The second positive and/or non-positive connecting means may also allow the fastening to be reversible. By allowing the fastening to be reversible, the mirror module, the components thereof and/or the base body may therefore be exchanged. According to an exemplary embodiment, the second positive and/or non-positive connecting means are snap closures. According to an exemplary embodiment, the second positive and/or non-positive connecting means are arranged on the second base body part. According to an exemplary embodiment, the second positive and/or non-positive connecting means are integral with the second base body part. According to an exemplary embodiment, the base body parts are injection-molded parts that may be produced cost-effectively. According to an exemplary embodiment, the connection of the base body parts is carried out by means of a material fit (e.g., by means of bonding or welding).

According to an exemplary embodiment, the second base body part comprises the sliding means in a sliding direction. In such an embodiment, the sliding means may be integral with the second base body part. As a result, only a very slightly higher material cost results for the second base body part, while the strength of the second base body part is advantageously improved by the sliding means. Further, the production costs are not substantially increased by the sliding means.

According to an exemplary embodiment, a component, such as a sun visor for a vehicle, comprises a base body and a mirror with a mirror cover. The mirror cover is arranged on the mirror. According to an exemplary embodiment, the base body comprises just one sliding means along which the mirror cover may be displaced in and counter to a sliding direction from a first position, in which the mirror is substantially covered by means of the mirror cover, into a second position, in which the mirror is at least partially not covered by means of the mirror cover. Due to the use of only one sliding means, along which the mirror cover may be displaced, the material cost for producing the component is low and the component may therefore be produced cost-effectively. Moreover, the mirror cover is not able to become skewed between two sliding means.

According to an exemplary embodiment, the mirror cover comprises a guiding means by means of which it is guided when displaced along the sliding means. As a result, the mirror cover is not able to distort or slip when displaced. By means of the guiding means it is ensured that the displacement is carried out easily and uniformly.

According to an exemplary embodiment, the mirror and the mirror cover are components of a mirror module so that the component is able to be manufactured in a modular manner.

According to an exemplary embodiment, the sliding means is a single-track sliding means so that the material cost is relatively low. According to an exemplary embodiment, the guiding means at least partially engages around the sliding means. As a result, the mirror cover is securely guided along the sliding means and does not distort when displaced.

According to an exemplary embodiment, a method of assembling a mirror module includes the step of arranging the mirror cover on the module frame at the side associated with the mirror and connecting the mirror to the module frame. According to an exemplary embodiment, the mirror is connected in a reversible manner by means of first positive and/or non-positive connecting means (e.g., snap closures). Due to the use of first positive and/or non-positive connecting means, the method may be carried out in a fully automated manner and is therefore very cost-effective.

According to an exemplary embodiment, the spring is arranged before, during or after the assembly of the mirror module on the guiding means of the mirror cover.

According to an exemplary embodiment, a method of assembling a component includes the step of inserting the mirror module into the recess. According to an exemplary embodiment, the insertion is reversible by means of second positive and/or non-positive connecting means (e.g., snap closures). Such a method may also provide for the use of second positive and/or non-positive connecting means so that it is substantially automated and therefore cost-effective.

According to an exemplary embodiment, the component is used as a sun visor of a motor vehicle. The sun visor may be produced in an automated manner, cost-effectively, rapidly and easily and the mirror cover may be very easily and uniformly displaced.

Before discussing in detail the exemplary embodiment shown in the FIGURES, it should be noted that the FIGURES are given merely by way of example and do not restrict the general idea of the invention.

Figure 2:
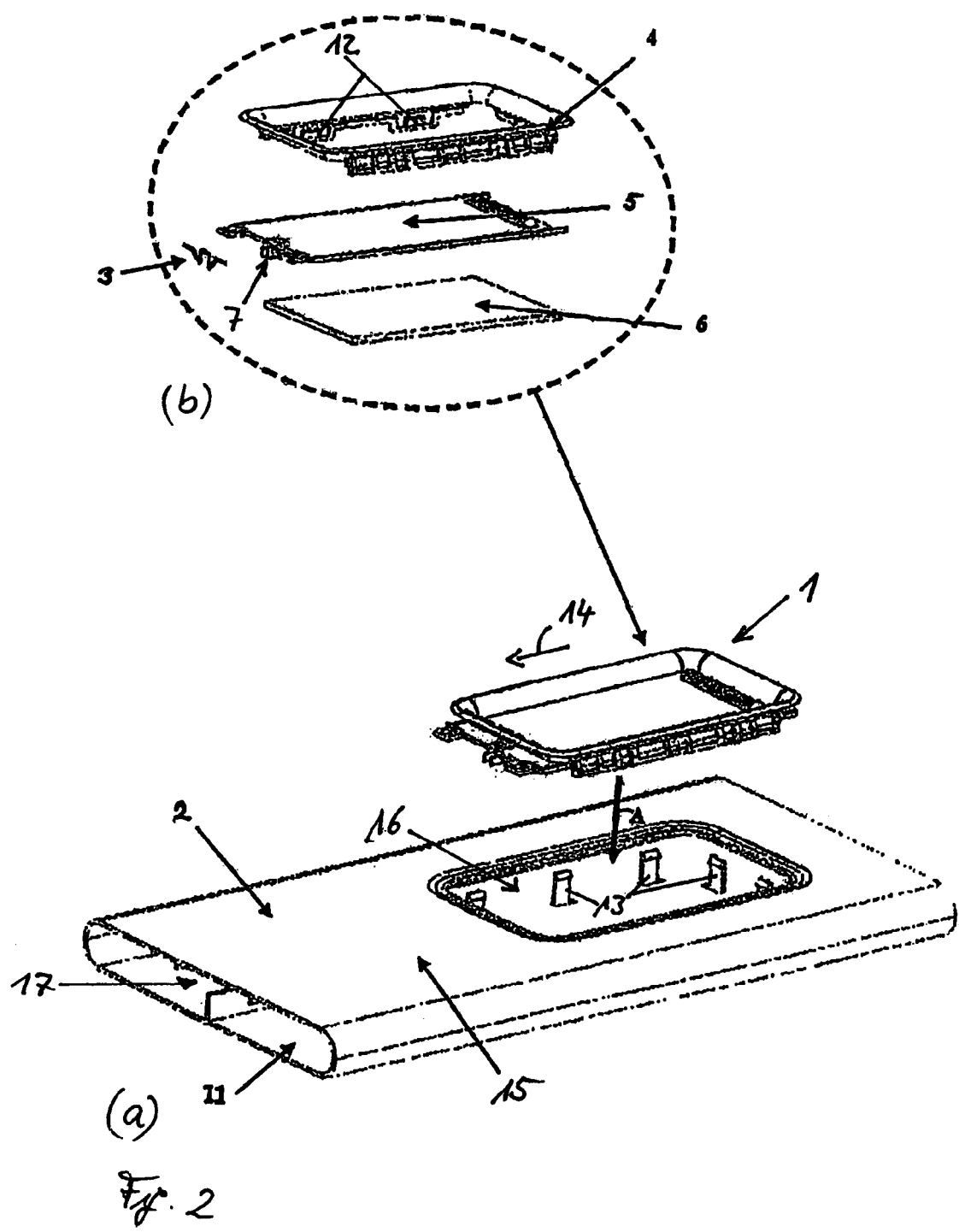
FIG. 2A is a partially exploded perspective view of a component and a mirror module shown according to an exemplary embodiment.
FIG. 2B is a detailed exploded view the mirror module of FIG. 2A shown according to an exemplary embodiment.

FIG. 1 shows a mirror cover 5 of a mirror module 1 (shown in FIGS. 2 and 4) according to an exemplary embodiment. FIG. 1A shows the mirror cover 5 in a plan view, while FIG. 1B shows the mirror cover 5 in a side view. The mirror cover 5 comprises a guiding means 7 which, according to the embodiment illustrated, is provided substantially in the center of one of the edges of the mirror cover 5 extending transversely to a sliding direction 14 in which the mirror cover 5 may be displaced in the installed state in the mirror module 1. According to an exemplary embodiment, the guiding means 7 comprises two arms 71, 72 extending substantially parallel to one another and substantially parallel to the sliding direction 14 and is substantially U-shaped in cross section. On the edges of the mirror cover 5 extending substantially parallel to the sliding direction 14, the guiding means 7 is shown as comprising one respective first compensating means 9 for compensating for manufacturing tolerances. The guiding means 7 is also shown as comprising two second compensating means 10 extending in a direction that is transverse to a plane formed by the mirror cover 5 and in the installed state substantially parallel to a mirror 6 (shown in FIGS. 2 and 4). The second compensating means 10 are provided to compensate for the manufacturing tolerances in the direction in which they extend. According to an exemplary embodiment, the second compensating means 10 are provided on moldings 110, which are arranged in the vicinity of the corners of the mirror cover 5, and on the same edge of the mirror cover 5 extending transversely to the sliding direction 14. According to the embodiment illustrated, the arms 71, 72 of the guiding means 7 are clamped to one another by means of a force means 3 so that a spacing 18 present between the arms 71, 72 is elastically contracted. The mirror cover 5 is further shown as comprising a stop 19 which limits the displacement of the mirror cover 5 in the sliding direction 14 and which serves as a "handle" for the user.

FIG. 2A shows a component according to an exemplary embodiment into which a mirror module 1 is inserted. FIG. 2B shows an exploded view of the mirror module 1 according to an exemplary embodiment. The mirror module 1 is inserted in an insertion direction, which is indicated by an arrow A, into a base body 15 of the component. According to an exemplary embodiment, the base body 15 comprises a first base body part 2, which has a recess 16, and a second base body part 11. The two base body parts 2 and 11 cooperate to form a cavity 17. According to an exemplary embodiment, second positive and/or non-positive connecting means 13, by means of which the mirror module 1 is fastened when inserting in the insertion direction A and into the recess 16 of the first base body part 2, are integrally arranged on the second base body part 11. In the installed state, the mirror module 1 extends at least partially in the cavity 17. Therefore, sufficient space is available for displacing the mirror cover 5 in the sliding direction 14. According to an exemplary embodiment, the first base body part 2 and the second base body part 11 are welded to one another before the insertion of the mirror module 1.

Referring to FIG. 2B in particular, the mirror module 1 is shown as comprising four components: a module frame 4, the mirror cover 5, a force means 3 and the mirror 6. To facilitate fastening the mirror 6 to the module frame 4, the module frame 4 comprises first positive and/or non-positive connecting means 12. According to an exemplary embodiment, the guiding means 7 arranged on the mirror cover 5 is visible.

In the installed state, the mirror module 1 is inserted into the component and/or the mirror 6 is fastened to the mirror module 1 so that by displacing the mirror cover 5 the mirrored surface of the mirror 6 is visible.

Figure 3:
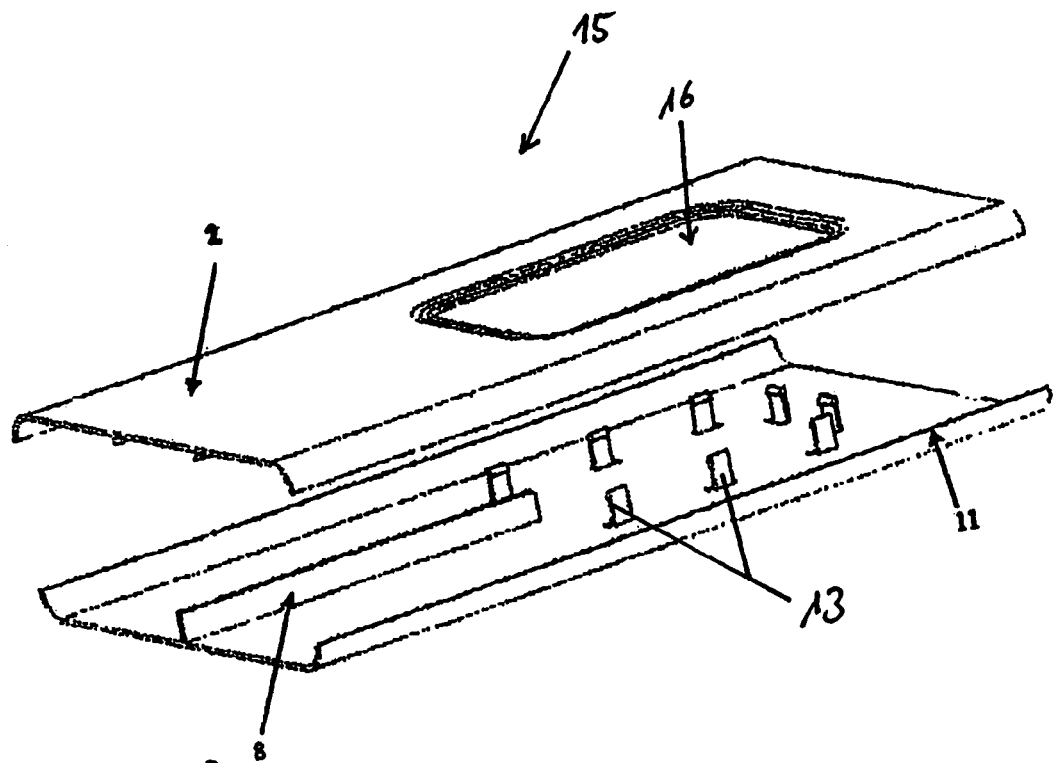
FIG. 3 is an exploded perspective view of a base body of a component shown according to an exemplary embodiment.

FIG. 3 shows an exploded view of the base body 15 of a component according to an exemplary embodiment. In this view, the recess 16 of the first base body part 2 and second positive and/or non-positive connecting means 13, as well as a sliding means 8 of the second base body part 11, which extends substantially in the sliding direction 14, and along which the mirror cover 5 may be displaced in the installed state, are visible.

Figure 4:
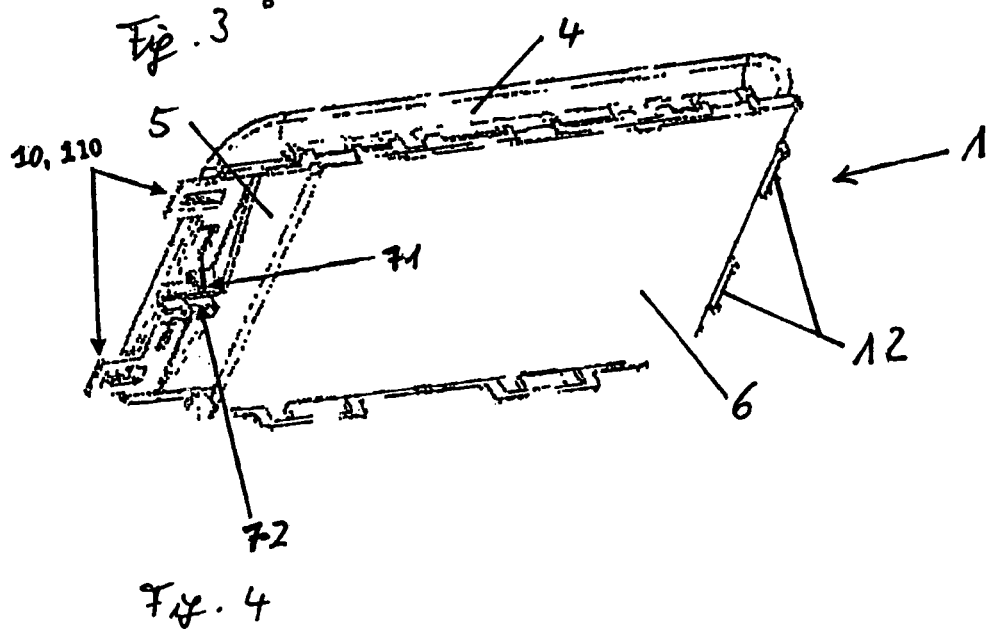
FIG. 4 is a rear perspective view of a mirror module shown according to an exemplary embodiment.

FIG. 4 shows a mirror module 1 according to an exemplary embodiment from a direction facing away from a user of the mirror module 1. FIG. 4 shows the mirror 6 from its rear face opposing the mirrored surface, which is fastened to the module frame 4 by means of the first positive and/or non-positive connecting means 12. The mirror cover 5 is arranged between the module frame 4 and the mirror 6. Also in FIG. 4, the arms 71, 72 of the guiding means 7 are visible. Further in FIG. 4, the moldings 110 are visible with the second compensation means 10.

The invention claimed is:

1. A component for a vehicle comprising:
a base body including a first base body part and a second base body part which cooperate to define a cavity, the second base part supporting a sliding means located within the cavity, the first base part defining a recess, the sliding means comprising a track;
a mirror supported at the base body and at least partially aligned with the recess;
a mirror cover arranged on the mirror, the mirror cover being displaceable along the sliding means in and counter to a sliding direction from a first position in which the mirror is substantially covered by the mirror cover, into a second position in which the mirror is at least partially not covered by the mirror cover, the mirror cover including a guiding means for guiding the mirror cover all the way through when being displaced along the sliding means between the first position and the second position, the guiding means comprising a first arm and a second arm; and
a spring biasing the first arm and the second arm towards the track and each other,
wherein the guiding means is provided substantially in a center of an edge of the mirror cover extending transversely to a sliding direction of the mirror cover,
wherein the first arm is provided on a first side of the track and the second arm is provided on a second side of the track,
wherein the first arm and the second arm extend in a direction that is substantially perpendicular to the mirror cover.

2. The component of claim 1 wherein the mirror and the mirror cover are components of a mirror module.

3. The component of claim 2 wherein the mirror module is inserted into the recess.

4. The component of claim 2 wherein the mirror module is arranged at least partially in the cavity.

5. The component of claim 4 wherein the sliding means extends along the second base body part in a sliding direction.

6. The component of claim 1 wherein the sliding means is a single-track sliding means.

7. The component of claim 1 wherein the guiding means at least partially engages around the sliding means.

8. The component of claim 1 wherein the track extends in a sliding direction.

9. The component of claim 8 wherein the first arm and the second arm are arranged substantially parallel to one another.

10. The component of claim 8 wherein the track is a single rail that is disposed between the first arm and the second arm.

11. The component of claim 1 wherein the mirror module is connected to the base body via snap closures which allow the connection to be reversible.

12. The component of claim 11 wherein the snap closures are provided on the second base body part.

13. The component of claim 11 wherein the component is a sun visor.

14. The component of claim 1 wherein the mirror cover further includes at least one first compensating means on an edge of the mirror cover extending substantially parallel to a sliding direction.

15. The component of claim 14 wherein the mirror cover further includes at least one second compensating means which extends transversely to a plane formed by the mirror cover.

16. The component of claim 1 wherein the first position is a closed position and the second position is an open position.

17. The component of claim 1 wherein the sliding means is integrally formed with the second base body part.

18. The component of claim 1 wherein the mirror cover comprises a stop that limits displacement of the mirror cover in a sliding direction, the stop being a handle that a user may use to move the mirror cover between the first position and the second position.

* * * * *